(12) United States Patent
Xiao et al.

(10) Patent No.: US 10,998,601 B2
(45) Date of Patent: May 4, 2021

(54) FLEXIBLE BATTERIES FOR WEARABLE DEVICES

(71) Applicant: NINGDE AMPEREX TECHNOLOGY LIMITED, Ningde (CN)

(72) Inventors: Liangzhen Xiao, Ningde (CN); Qiao Zeng, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 167 days.

(21) Appl. No.: 16/125,378

(22) Filed: Sep. 7, 2018

(65) Prior Publication Data
US 2020/0044222 A1 Feb. 6, 2020

(30) Foreign Application Priority Data
Aug. 6, 2018 (CN) .......................... 201810885472.8

(51) Int. Cl.
*H01M 50/502* (2021.01)
*H01M 50/531* (2021.01)

(52) U.S. Cl.
CPC ....... *H01M 50/502* (2021.01); *H01M 50/531* (2021.01)

(58) Field of Classification Search
CPC .......... H01M 2/204; H01M 2/26; H01M 4/80; H01M 2/1022; H01M 2220/30; H01M 2/22; H01M 10/0585; H01M 10/0587; H01M 10/0525
USPC .......................................................... 429/94
See application file for complete search history.

(56) References Cited

U.S. PATENT DOCUMENTS

2013/0004815 A1  1/2013 Kawamoto
2016/0301044 A1* 10/2016 Huang ................ H01M 10/425
2018/0210491 A1  7/2018 Song et al.

OTHER PUBLICATIONS

Ningde Amperex Technology Limited, Extended European Search Report, EP19190006.7, dated Dec. 17, 2019, 7 pgs.

* cited by examiner

*Primary Examiner* — Gary D Harris
(74) *Attorney, Agent, or Firm* — Morgan, Lewis & Bockius LLP (57) ABSTRACT

A battery for powering a wearable device comprises a first cell, a second cell interconnected with the first cell, and a connection electrically coupled between the first cell and the second cell. The connection extends from the first cell to the second cell along a first direction. A length of the connection along the first direction is greater than a distance between the first cell and the second cell. In some embodiments, the connection comprises a folded structure configured to accommodate a dimensional change of the battery when bending the wearable device.

18 Claims, 10 Drawing Sheets

FLEXIBLE BATTERIES FOR WEARABLE DEVICES

CROSS-REFERENCE TO RELATED APPLICATION

This application claims priority to Chinese Patent Application No. 201810885472.8, entitled "FLEXIBLE BATTERIES FOR WEARABLE DEVICES" filed on Aug. 6, 2018 at the State Intellectual Property Office of the People's Republic of China (SIPO), the disclosure of which is expressly incorporated by reference herein in its entirety.

TECHNICAL FIELD

The present application is related generally to the field of energy storage devices, and in particular, to flexible lithium ion batteries.

BACKGROUND

With the development of science and technology, various electronic products emerge and are almost indispensable in daily life. With advantages of high energy density, long cycle life, environmental friendliness and reproductively, lithium ion batteries have been widely used in various electronic products.

Batteries for wearable electronic devices require certain flexibility to fit the shape of the wearable devices and to accommodate shape and/or volume change when using the wearable device. Conventional batteries with liquid electrolyte do not have sufficient flexibility to meet the requirement of a wearable device. Batteries with gel or solid electrolyte suffer from low energy density and poor ion mobility. Accordingly, it would be desirable to have batteries with high flexibility while maintain high energy and power density to accommodate the need from the portable and wearable electronic devices.

SUMMARY

Conventional batteries with liquid electrolyte do not have enough flexibility to satisfy the requirement of wearable devices. Recent batteries with solid or gel electrolyte may improve the flexibility, however the electrochemical performance is low due to the poor ion mobility in the solid and gel electrolyte materials. An object of the present application is to provide a flexible battery formed by joining conventional cells using flexible connections in between. A flexible connection may have a folded structure that is bendable to a certain curvature to fit the shape change when using the wearable device. Such lithium ion battery can provide flexibility to power various wearable devices with improved energy density, reliability, and safety after many cycles.

According to an aspect of the present application, a battery for powering a wearable device comprises a first cell, a second cell interconnected with the first cell, and a connection electrically coupled between the first cell and the second cell. The connection extends from the first cell to the second cell along a first direction. A length of the connection along the first direction is greater than a distance between the first cell and the second cell. In some embodiments, the connection comprises a folded structure configured to accommodate a dimensional change of the battery when bending the wearable device.

BRIEF DESCRIPTION OF DRAWINGS

The accompanying drawings, which are included to provide a further understanding of the embodiments and are incorporated herein and constitute a part of the specification, illustrate the described embodiments and together with the description serve to explain the underlying principles. Like reference numerals refer to corresponding parts.

DETAILED DESCRIPTION

Reference will now be made in detail to specific embodiments, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details. For example, it will be apparent to one of ordinary skill in the art that the subject matter presented herein can be implemented on many types of energy storage devices, such as batteries. The terms "front", "behind", "left", "right", "upper" and "lower" described in the present application are given with reference to the state where a lithium ion electric roll is disposed in the accompanying drawings.

Figure 1A:
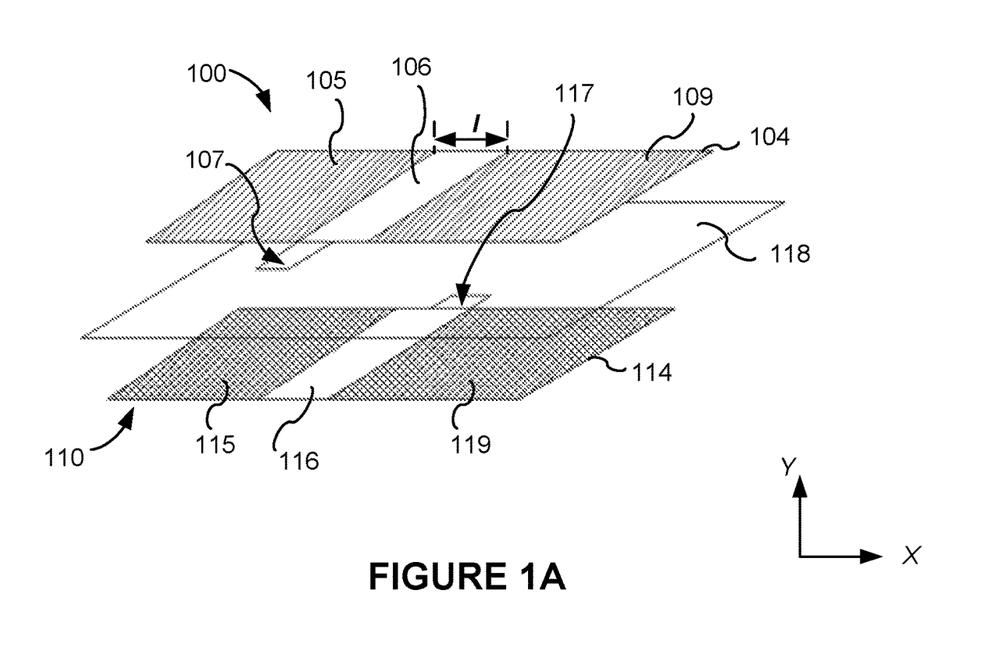
FIG. 1A is a schematic diagram of a first electrode, a separator, and a second electrode for making a flexible battery, in accordance with some embodiments.

FIG. 1A is a schematic structural diagram of a first electrode 100, a separator film 118, and a second electrode 110 for making a flexible (also "bendable," or "curved") battery, in accordance with some embodiments. In some embodiments, the first electrode 100 includes a plurality of segments, including a first coated segment 105 and a second coated segment 109 interconnected by an uncoated segment 106 between the first and second segments. The first coated segment 105, the uncoated segment 106, and the second coated segment 109 are sequentially disposed along X direction. In some embodiments, the first coated segment 105 and the second coated segment 109 of the first electrode 100 are formed by coating first active material 122 (FIG. 1B) on one surface (i.e., the surface facing the second electrode 110) or both surfaces of a first current collector 104. In some embodiments, the uncoated segment 106 corresponds to an uncoated (e.g., bare) portion of the first current collector 104. In some embodiments, the first electrode 100 further includes a tab 107 (also referred to as "a terminal" or "a contact"). In one example, the tab 107 is attached to the uncoated segment 106. In another example, the tab 107 is a part of the current collector 104 that is connected to the uncoated segment 106 and preserved from a metal sheet when cutting the first current collector 104 out from the metal sheet.

Figure 1B:
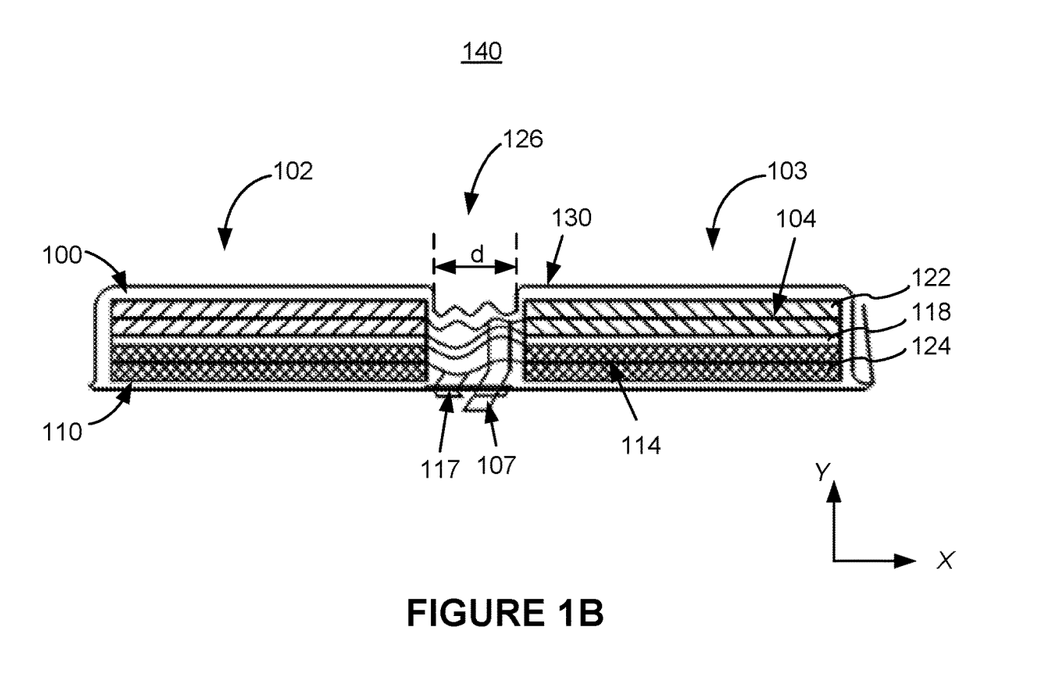
FIG. 1B is a cross-sectional view of a flexible battery, in accordance with some embodiments.
Figure 1C:
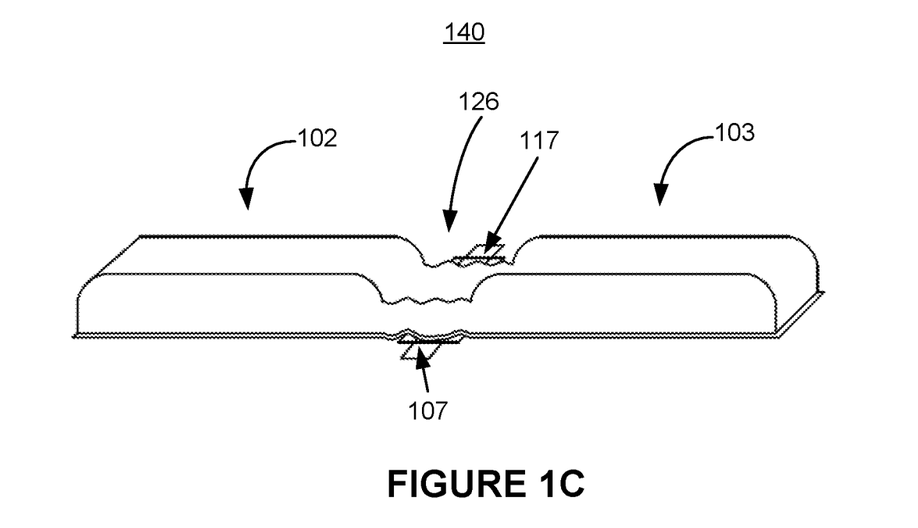
FIG. 1C is a perspective view of a flexible battery, in accordance with some embodiments.

In some embodiments, the second electrode 110 includes a plurality of segments, including a first coated segment 115 and a second coated segment 119 interconnected by an uncoated segment 116 between the first and second segments. The first coated segment 115, the uncoated segment 116, and the second coated segment 119 are sequentially disposed along X direction. In some embodiments, the first coated segment 115 and the second coated segment 119 of the second electrode 110 are formed by coating second active material 124 (FIG. 1B) on one surface (i.e., the surface facing the first electrode 100) or both surfaces of a second current collector 114. The uncoated segment 116 corresponds to an uncoated (e.g., bare) portion of the second current collector 114. In some embodiments, the second electrode 110 further includes a tab 117. In one example, the tab 117 is attached to the uncoated segment 116. In another example, the tab 117 is a part of the current collector 114 that is connected to the uncoated segment 116 and preserved from a metal sheet when cutting the second current collector 114 out from the metal sheet. In some embodiments, the tab 107 and the tab 117 are disposed on opposite sides of the battery 140 and extend towards opposite directions as illustrated in FIGS. 1A-1C. In some embodiments, the tabs do not overlap along the thickness dimension.

In some embodiments, the first electrode 100 as discussed in FIGS. 1A-1B is a cathode, and the second electrode 110 is an anode of the battery 140. Alternatively, the first electrode 100 is an anode and the first electrode 110 is a cathode of the battery 140.

FIGS. 1B-1C are cross-sectional view and perspective view of the battery 140 respectively, in accordance with some embodiments. In some embodiments as shown in FIG. 1B, the battery 140 includes a first cell 102 and a second cell 103 interconnected via a connection 126. In some embodiments, the connection 126 is disposed between the first cell 102 and the second cell 103 along X direction and is electrically coupled between the first cell 102 and the second cell 103. For each of the first cell 102 and the second cell 103, electrolyte (not shown) is disposed between the two electrodes. In some embodiments, a packaging film 130 is used to seal and package the battery 140.

In some embodiments, the battery 140 is formed by sequentially stacking the first electrode 100, the separator 118, and the second electrode 110 along Y direction as illustrated in FIG. 1A. In some embodiments, the first cell 102 includes the first segment 105 of the first electrode 100, the first segment 115 of the second electrode 110, and a portion of the separator 118 and electrolyte disposed between the first and second electrodes. The second cell 103 includes the second segment 109 of the first electrode 100, the second segment 119 of the second electrode 110, and a portion of the separator 118 and electrolyte disposed between the first and second electrodes. In some embodiments, the connection 126 includes the uncoated segment 106 of the first electrode 100, the uncoated segment 116 of the second electrode 110, and a portion of the separator 118 disposed in-between. In some embodiments, the uncoated segments 106 and 116 at the connection 126 are also referred to as "connection current collectors." In some embodiments, the connection 126 may or may not include electrolyte. In some embodiments, the connection 126 is thinner than the first cell 102 or the second cell 103.

In some embodiments, the uncoated anode current collector selected from the uncoated segments 106 and 116 of the first and second electrodes respectively has a smaller area than the uncoated cathode current collectors between the uncoated segments 106 and 116. In some embodiments in one cell, the coated anode segment (e.g., selected from the coated segments 105 and 115) has a bigger area than the coated cathode segment (e.g., between the coated segments 105 and 115) within the same cell. In some embodiments, the total uncoated area on an electrode, e.g., including one or more uncoated segments such as uncoated segment 106, takes up less than 50% area of the entire current collector of the electrode.

In some embodiments, the connection 126 includes one or two uncoated current collectors (e.g., cathode current collector and/or anode current collector). In some other embodiments, the connection 126 includes one or two current collectors (e.g., cathode current collector and/or anode current collector) that are coated with active materials on only one surface of each current collector. In yet some other embodiments, the connection 126 includes one or two current collectors (e.g., cathode current collector and/or anode current collector) that are coated with active materials on both surfaces of each current collector.

Figure 1D:
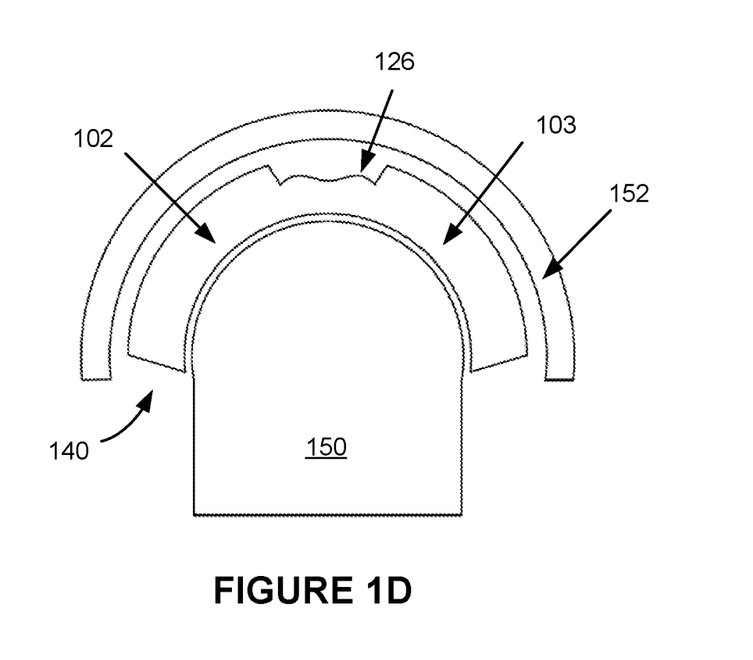
FIG. 1D illustrates an exemplary method of forming a curved battery to accommodate a shape of a wearable device, in accordance with some embodiments.

In some embodiments as illustrated in FIGS. 1A-1C, a length l of the connection 126 (e.g., the length of the uncoated or coated current collector in its original straightened and flattened state without folds, creases, or deformation to the material as shown in FIG. 1A) along the X direction is longer than a distance d between the first cell 102 and the second cell 103 in the packaged battery 140 as illustrated in FIG. 1B (e.g., without bending, stretching, or twisting the battery). In some embodiments as illustrated in FIGS. 1B and 1C, the uncoated current collectors 106 and 116, the separator 118, and the packaging film 130 at the connection area 126 has folded structures that are configured to accommodate a dimensional change of the battery 140. For example, when the battery 140 deforms, such as bending (e.g., as illustrated in FIG. 1D below), stretching, or slightly rotating (e.g., the first cell 102 and the second cell 103 rotate along opposite directions), the folded structures of the connection 126 can bend, stretch, or twist accordingly to accommodate the shape and/or volume change without bringing mechanical or electrical failures, or plastic deformation to the materials of the battery 140.

In some embodiments, the cathode current collector comprises an aluminium (Al) sheet, and the anode current collector comprises a copper (Cu) sheet. In some embodiments, each of the cathode current collector and the anode current collector is bendable and has a thickness in a range from about 100 nm to about 5000 μm. In some embodiments, the materials and the design of the cathode current collector and the anode current collector provide sufficient strength to withstand an applied load to bend the battery without causing failure or plastic deformation to the materials. In some embodiments, the coated current collectors within the packaged battery can bend and hold a certain curvature to accommodate the shape of a wearable electronic device.

In some embodiments, the cathode active material includes a material or a mixture of two or more materials selected from LiCoO2, LiNiO2, LiMn2O4, LiFePO4, LiMnPO4, LiCoPO4, Li2MxMn4-xO8 (M=Fe, Co), MnO2, V2O5, TiS2, and MoS2. In some embodiments, the anode active material includes one material or a mixture of two or more materials selected from carbon-based anode (e.g., graphite, graphene, carbon nanotubes, carbon nanowires, etc.), tin(Sn)-based anode (e.g., SnO2, Sn-based composites, Sn-based compounds, Sn-based alloys), silicon(Si)-based anode (e.g., SiO2, Si-based composites, Si-based compounds), titanium oxide (TiO2), Ti-based alloys, lithium metal (Li), and iron oxide (Fe2O3, Fe3O4, etc.). The compatibilities of working voltages and chemistry between the cathode and the anode may also be considered when selecting the cathode active material and the anode active material for a lithium ion battery. In some embodiments, the cathode active material and the anode active material have particle sizes in a range from a few nanometers (nm) to a few hundreds of micrometres (μm). In some embodiments, the cathode and anode active materials have various particle shapes, such as nanoparticles, nanotubes, nanopowders, nanoballs, nanoflakes, nanowires, etc. In some embodiments, the active material is mixed with additives and binders to form a paste which is then coated on the corresponding current collector to form the corresponding electrode. In some other embodiments, the active material can be deposited onto the corresponding current collector using any suitable method, such as chemical vapour deposition (CVD), physical vapour deposition (PVD), pulsed laser deposition (PLD), magnetron sputtering deposition, electrochemical depo, epitaxial growth, spin coating method, etc.

In some embodiments, the separator 118 is made of one or more materials selected from polyethylene, polypropylene, polyethylene terephthalate, polyimide, and aramid. For example, polyethylene for the separator can be high-density polyethylene, low-density polyethylene, or polyethylene with ultra-high molecular weight. Polyethylene separator and polypropylene separator can effectively prevent short-circuit between the cathode current collector and the anode current collector and thus improve stability and cyclability of the battery. In some embodiments, one or both surfaces of the separator is porous, and the pours layer includes inorganic particles and binders. In some embodiments, the inorganic particles include one or more inorganic compounds selected from aluminum oxide ($Al_2O_3$), silicon oxide (SiO2), magnesium oxide (MgO), titanium oxide (TiO2), hafnium dioxide (HfO2), tin oxide (SnO2), cerium oxide (CeO2), nickel oxide (NiO), zinc oxide (ZnO), calcium oxide (CaO), zirconium oxide (ZrO2), yttrium oxide (Y2O3), silicon carbide (SiC), boehmite, aluminum hydroxide, magnesium hydroxide, calcium hydroxide, and barium sulfate. In some embodiments, the binders include one or more types of materials selected from polyvinylidene fluoride, vinylidene fluoride-hexafluoropropylene copolymer, polyamide, polyacrylonitrile, polyacrylate, polyacrylic acid, polyacrylate, carboxymethylcellulose sodium, polyvinyl pyrrolidone, polyethylene, polymethylmethacrylate, polytetrafluoroethylene, and polyhexafluoropropylene. The porous surface can improve thermal resistance and oxidation resistance of the separator. The porous surface can also have an improved electrolyte infiltration effect to provide a better contact between the separator and the cathode and anode, In some embodiments, the battery 140 includes an electrolyte (not shown) disposed between the cathode and the anode. In some embodiments, the battery 140 can use a liquid electrolyte, a gel electrolyte, or a solid electrolyte. The liquid electrolyte can be one or more lithium-based salts selected from LiPF6, LiBF4, LiAsF6, LiClO4, LiB(C6H5)4, LiCH3SO3, LiCF3SO3, LiN(SO2CF3)2, LiC(SO2CF3)3, LiSiF6, LiBO and LIODFB dissolved in a nonaqueous solvent.

The nonaqueous solvent may include a carbonate ester compound, a carboxylic acid compound, an ether compound, other suitable organic solvent, or a combination thereof. In some embodiments, the carbonate ester compound may be a chain carbonate compound, a cyclic carbonate compound, a fluorocarbonate compound, or a combination thereof. Examples of chain carbonate compounds include diethyl carbonate (DEC), dimethyl carbonate (DMC), dipropyl carbonate (DPC), methylpropyl carbonate (MPC), ethylene carbonate (EPC), carbonic acid ethyl acetate (MEC), and combinations thereof. Examples of cyclic carbonate compounds include ethylene carbonate (EC), propylene carbonate (PC), butylene carbonate (BC), vinyl ethylene carbonate (VEC), and combinations thereof. Examples of fluorocarbonate compounds include fluoroethylene carbonate (FEC), 1,2-difluoroethylene carbonate, 1,1-difluoroethylene carbonate, and 1,1,2-tricarboxylic acid. Fluoroethylene, 1,1,2,2-tetrafluoroethylene carbonate, 1-fluoro-2-methylethyl carbonate, 1-fluoro-1-methyl-ethylene carbonate, carbonic acid 1,2-Difluoro-1-methylethylene, 1,1,2-trifluoro-2-methylethyl carbonate, trifluoromethyl ethylene carbonate, and combinations thereof. Examples of carboxylic acid ester compounds include methyl acetate, ethyl acetate, n-propyl acetate, tert-butyl acetate, methyl propionate, ethyl propionate, γ-butyrolactone, terpene lactone, valerolactone, DL-mevalonic acid lactone, caprolactone, methyl formate, and combinations thereof. Examples of ether compounds include dibutyl ether, tetraethylene glycol dimethyl ether, diethylene glycol dimethyl ether, 1,2-dimethoxyethane, 1,2-diethoxyethane, and ethoxymethoxy. Ethane, 2-methyltetrahydrofuran, tetrahydrofuran and combinations thereof. Examples of ether compounds include dibutyl ether, tetraethylene glycol dimethyl ether, diethylene glycol dimethyl ether, 1,2-dimethoxyethane, 1,2-diethoxyethane, and Ethoxymethoxyethane, 2-methyltetrahydrofuran, tetrahydrofuran, and combinations thereof. Examples of other organic solvents include dimethyl sulfoxide, 1,2-dioxolane, sulfolane, methyl sulfolane, 1,3-dimethyl-2-imidazolidinone, N-methyl-2-pyrrolidone, Formamide, dimethylformamide, acetonitrile, trimethyl phosphate, triethyl phosphate, trioctyl phosphate, phosphate esters, and combinations thereof.

In some embodiments, the packaging material 130 includes three layers. In some embodiments, the inner layer (closest to the electrodes) is made of a polymer material such as polypropylene. The outer layer may be made of a polymer material such as nylon. In some embodiments, the middle layer disposed between the inner layer and the outer layer is a metal layer, such as an aluminum (Al) or a stainless steel sheet.

Figure 1E:
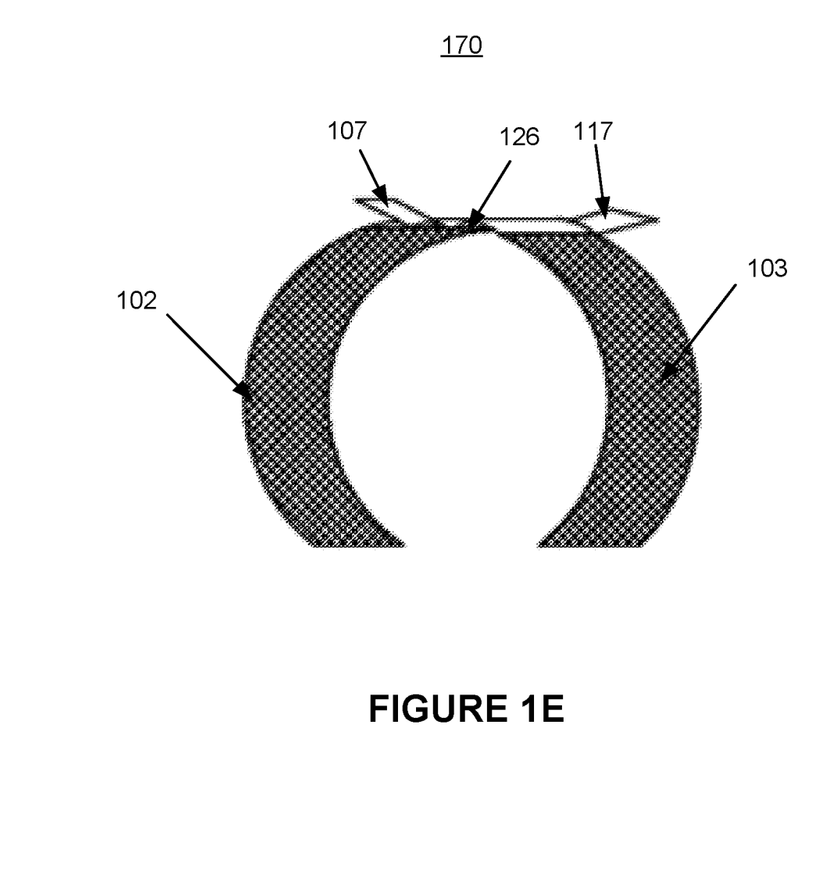
FIG. 1E is a schematic diagram of a curved battery, in accordance with some embodiments.
Figure 1F:
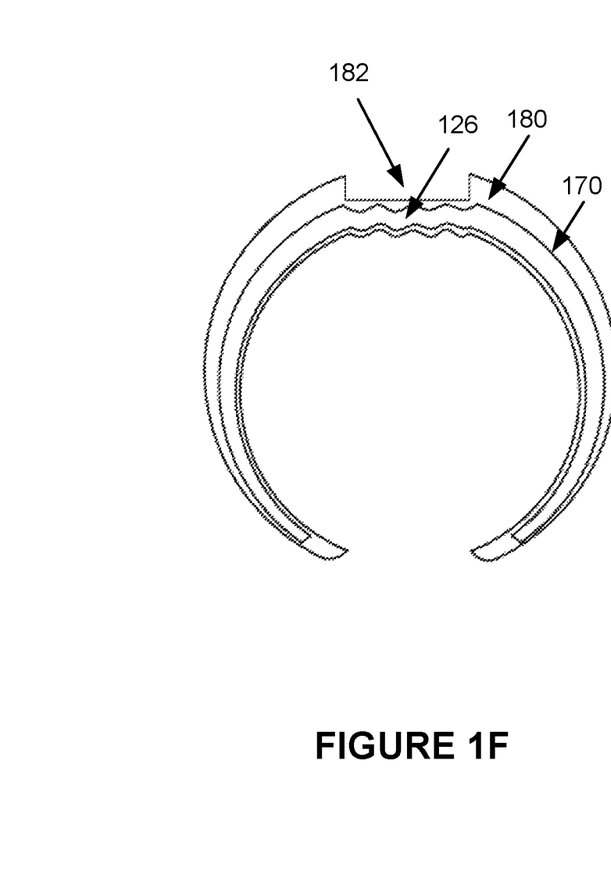
FIG. 1F is a schematic diagram illustrating a wearable device contains a curved battery, in accordance with some embodiments.

FIG. 1D illustrates an exemplary method of shaping a curved battery (e.g., a flexible battery) to accommodate a shape of a wearable device. FIG. 1E illustrates a curved battery 170 formed using the method of FIG. 1D. FIG. 1F is a schematic diagram illustrating a wearable device 180 that contains the curved battery 170, in accordance with some embodiments. In some embodiments, the curved battery is formed by a die forging process (e.g., or a metal pressing) as illustrated in FIG. 1D. In some embodiments, one or more dies are used to shape the battery. In some embodiments, the battery 140 may be heated to a certain temperature during the bending process (wherein the temperature does not cause electrochemical and/or material failure of the battery 140). For example, as shown in FIG. 1D, the packaged battery 140 (FIGS. 1B-1C) is placed between a concaved shaped die 152 (e.g., an arc) and a convex shaped die 150, and a predetermined pressure or force is applied to bend the battery to have a certain curvature.

In some embodiments as illustrated in FIG. 1E, after the shaping process, the connection 126 is bended, and the first and second cells 102 and 103 are also bended to have a certain curvature. In some embodiments, the curvature is predetermined in accordance with the shape of the wearable device (e.g., the wearable device 180, FIG. 1F), which is powered by the curved battery 170. In some embodiments as discussed above, the connection 126 is flexible (e.g., bendable) during use of the wearable device. For example, the connection 126 is located at the bendable part 182 of the wearable device 180, such that the connection 126 can bend to a certain degree to make it more convenient for the user to put on and take off the wearable device 180 through bending the part 182.

In some embodiments, the wearable device 180 includes, but is not limited to, a head-mounted display, a piece of clothing, a smart watch, a smart ring, a smart band, a pair of glasses/goggles, etc. The wearable device 180 can be used for a gaming device, a medical device, a personal fitness tracker, or a sports tracker, etc.

Figure 2A:
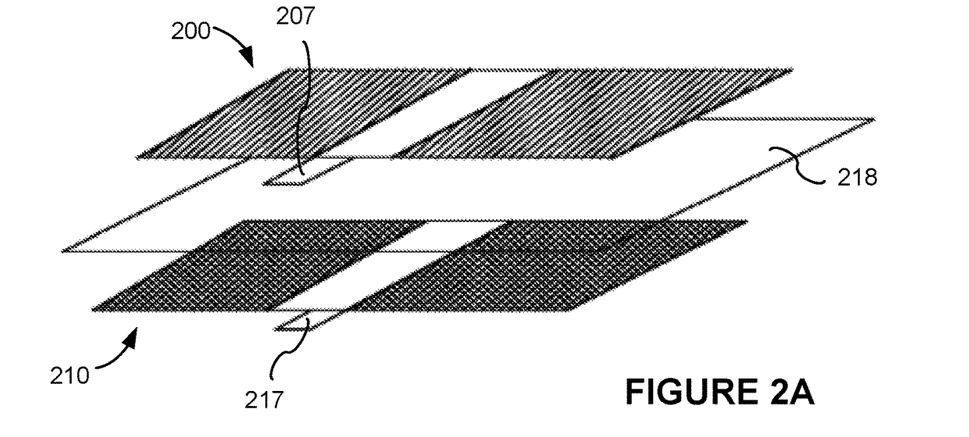
FIG. 2A is a schematic diagram of a first electrode, a separator, and a second electrode for making a flexible battery having two tabs on the same side, in accordance with some embodiments.

FIG. 2A is a schematic diagram of a first electrode 200, a separator 218, and a second electrode 210 for making a flexible battery, in accordance with some embodiments. In some embodiments, the first electrode 200, the separator 218, and the second electrode 210 are substantially similar to the first electrode 100, the separator 118, and the second electrode 110 respectively, as discussed with reference to FIG. 1A. In some embodiments, a first tab 207 on the first electrode 200 and a second tab 217 on the second electrode 210 are disposed on the same side of the battery 240 (FIGS. 2B-2C) and extend towards the same direction as illustrated in FIGS. 2A-2C.

Figure 2B:
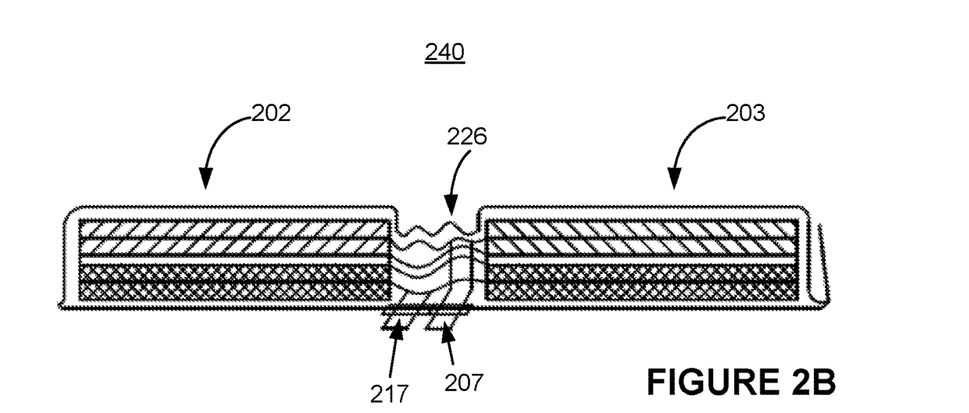
FIGS. 2B and 2C include a cross-sectional view and a perspective view of a flexible battery having two tabs on the same side, in accordance with some embodiments.
Figure 2C:
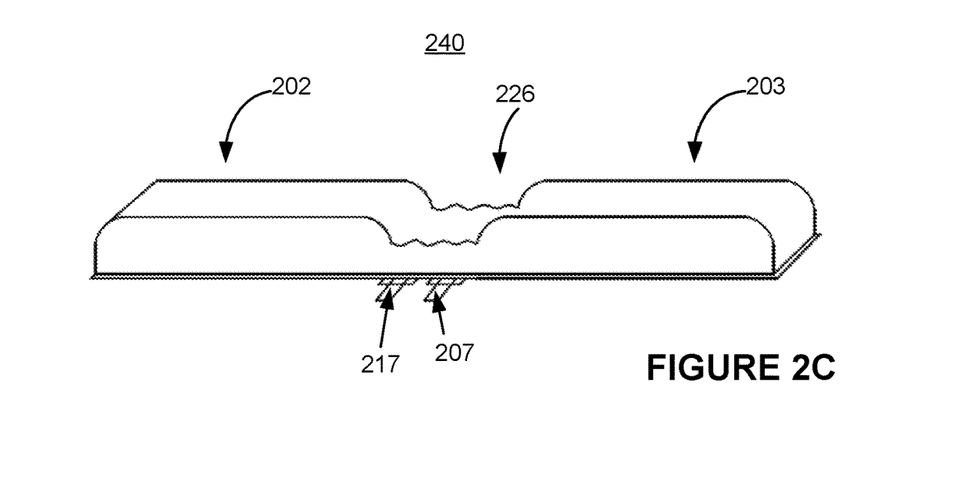

FIGS. 2B and 2C includes a cross-sectional view and a perspective view of a flexible battery 240, in accordance with some embodiments. In some embodiments, the flexible battery 240 includes a first cell 202 and a second cell 203 interconnected via a connection 226. In some embodiments, the first cell 202, the connection 226, and the second cell 203 are substantially similar to the first cell 102, the connection 126, and the second cell 103 of the flexible battery 140 as discussed with reference to FIGS. 1B-1C. In some embodiments, the tabs 207 and 217 are disposed on the same side of the battery 240 and extend towards the same direction as illustrated in FIGS. 2A-2C.

Figure 3A:
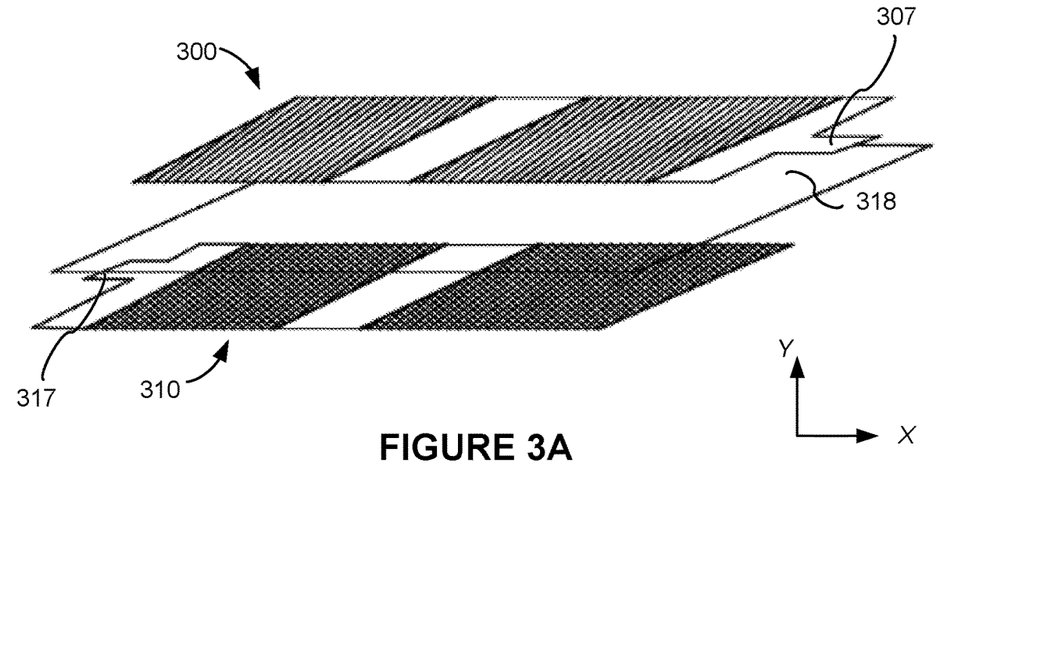
FIG. 3A is a schematic diagram of a first electrode, a separator, and a second electrode for making a flexible battery having two tabs on two opposite ends, in accordance with some embodiments.

FIG. 3A is a schematic diagram of a first electrode 300, a separator 318, and a second electrode 310 for making a flexible battery 340, in accordance with some embodiments. In some embodiments, the first electrode 300, the separator 318, and the second electrode 310 are substantially similar to the first electrode 100, the separator 118, and the second electrode 110 respectively, as discussed with reference to FIG. 1A. In some embodiments, a first tab 307 on the first electrode 300 and a second tab 317 on the second electrode 310 are disposed on opposite ends (along X direction) of the battery 340 (FIG. 3C) and extend towards opposite directions as illustrated in FIGS. 3A-3B.

Figure 3B:
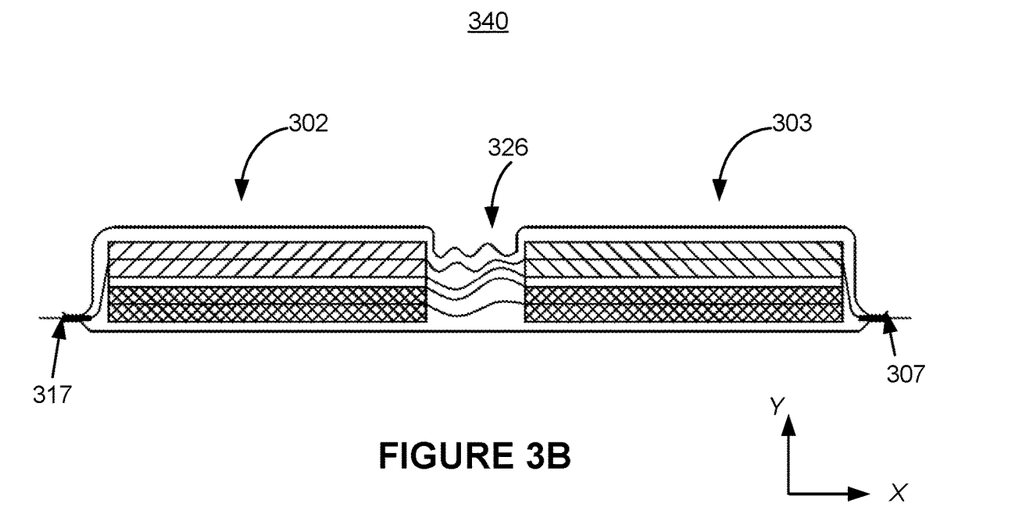
FIG. 3B includes a cross-sectional view of a flexible battery having two tabs on two opposite ends, in accordance with some embodiments.

FIG. 3B includes a cross-sectional view of the flexible battery 340, in accordance with some embodiments. In some embodiments, the flexible battery 340 includes a first cell 302 and a second cell 303 interconnected via a connection 326. In some embodiments, the first cell 302, the connection 326, and the second cell 303 are substantially similar to the first cell 102, the connection 126, and the second cell 103 of the flexible battery 140 as discussed with reference to FIGS. 1B-1C. In some embodiments, the tabs 307 and 317 are disposed on opposite ends (along X direction) of the battery 340 and extend towards opposite directions as illustrated in FIGS. 3A-3C.

Figure 4A:
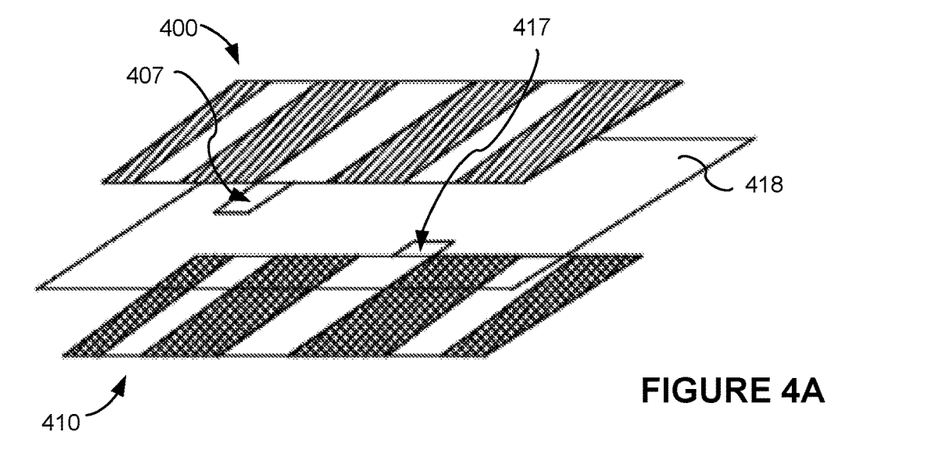
FIG. 4A is a schematic diagram a first electrode, a separator, and a second electrode for making a flexible battery including multiple flexible connections, in accordance with some embodiments.

FIG. 4A is a schematic diagram a first electrode 400, a separator 418, and a second electrode 410 for making a flexible battery. In some embodiments, the first electrode 400 (e.g., cathode or anode) includes more than two coated segments, each of which is similar to the coated segment 105 (FIG. 1A), and the second electrode 410 (e.g., anode or cathode opposite to the first electrode 400) includes more than two coated segments, each of which is similar to the coated segment 115 (FIG. 1A). In some embodiments, the first electrode 400 includes more than one uncoated segment (e.g., uncoated current collector) that is similar to the uncoated segment 106 (FIG. 1A). Similarly, the second electrode 410 includes more than one uncoated segment that is similar to the uncoated segment 116 (FIG. 1A).

Figure 4B:
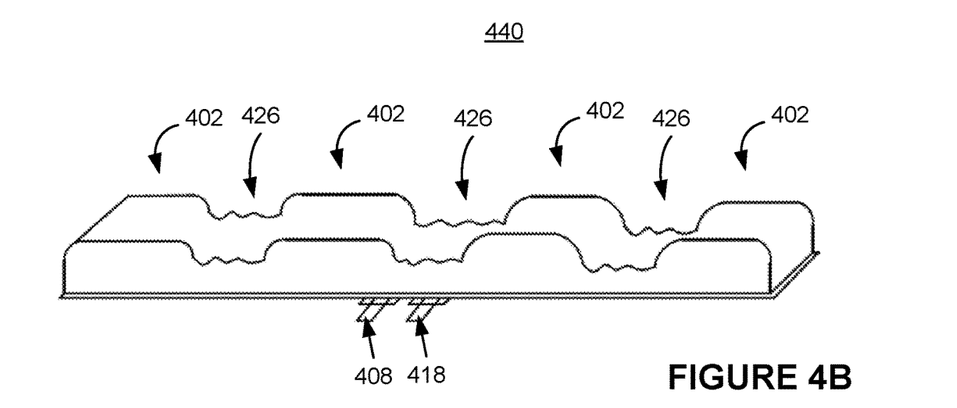
FIG. 4B is a schematic diagram of a flexible battery including multiple flexible connections, each of which respectively disposed between adjacent cells, in accordance with some embodiments.

FIG. 4B is a schematic diagram of a flexible battery 440 including multiple flexible connections 426, each of which respectively disposed between adjacent cells 402, in accordance with some embodiments. In some embodiments, the flexible battery 440 includes more than two cells 402 interconnected via flexible connections 426. In some embodiments, the cell 402 and the connection 426 are substantially similar to the cell 102 and the connection 126 of the flexible battery 140 as discussed with reference to FIGS. 1B-1C. The flexible battery 440 is also sealed and packaged. In some embodiments, the increased number of flexible connections 426 within the flexible battery 440 can substantially improve the flexibility of the battery 440.

Figure 4C:
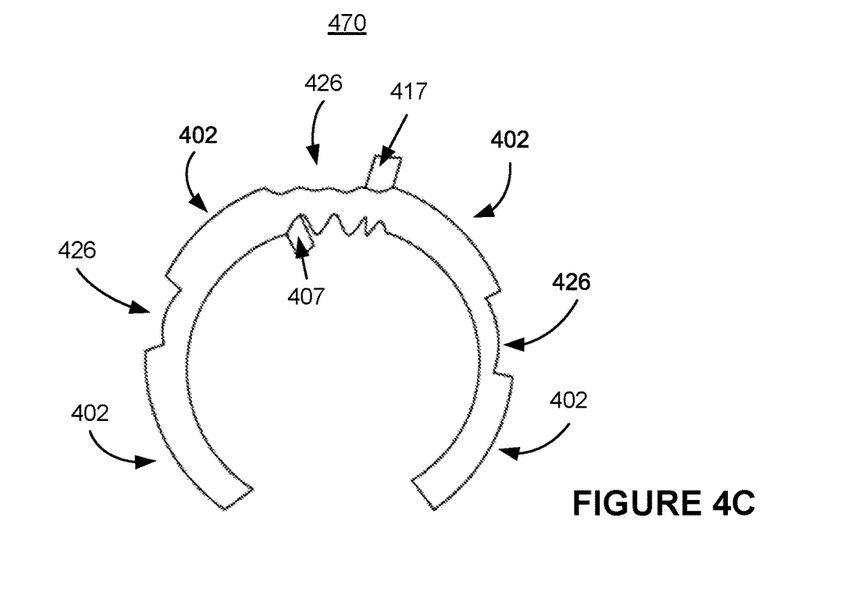
FIG. 4C is a schematic diagram of a curved battery, in accordance with some embodiments.

FIG. 4C is a schematic diagram of a curved battery 470, in accordance with some embodiments. In some embodiments, the curved battery 470 is formed using the die forging process as shown in FIG. 1D. For example, the packaged battery 440 is placed between a concaved shaped die and a convex shaped die as shown in FIG. 1D, and a predetermined pressure or force is applied to bend the battery to have a certain curvature. In some embodiments, the multiple flexible connections 426 of the curved battery 470 can further bend to certain degrees as needed by the user when using the wearable device.

In some embodiments as shown in FIGS. 4A and 4C, the tabs 407 and 417 are similar to the tabs 107 and 117 respectively (FIG. 1A), and they are disposed on opposite sides of the corresponding electrode and pointing to opposite directions. In some other embodiments, the tabs 408 and 418 are disposed on the same side of the battery 440 (FIG. 4B) and extend towards the same direction as illustrated in FIG. 4B.

Figure 4D:
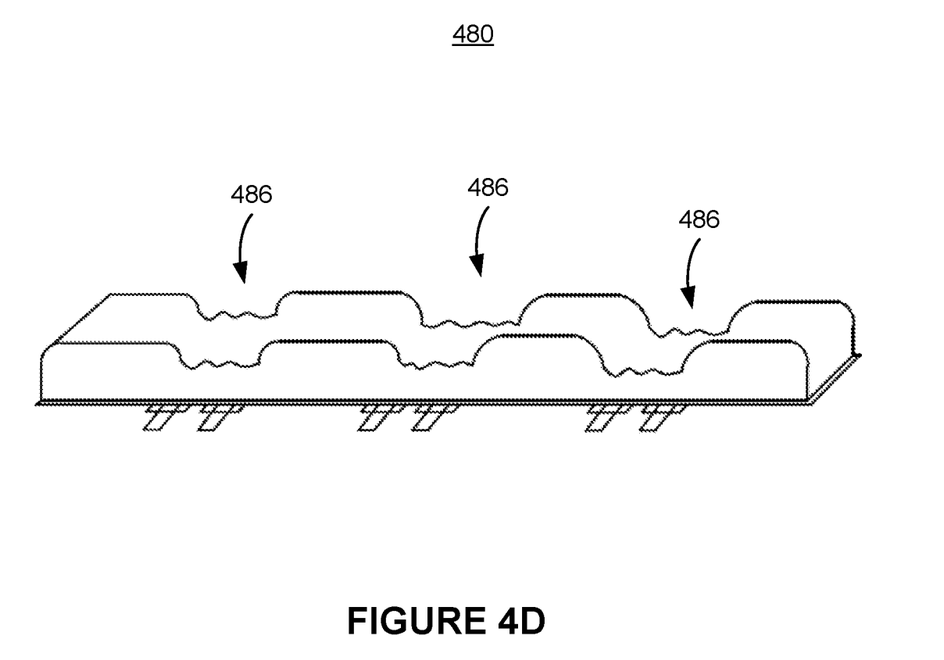
FIG. 4D is a schematic diagram of a flexible battery including a plurality of flexible connections and more than one pair of tabs, in accordance with some embodiments.

FIG. 4D is a schematic diagram of a flexible battery 480 including a plurality of flexible connections 486 and a plurality of pairs of tabs, in accordance with some embodiments. The plurality pairs of the tabs can be disposed on the same side of the electrode or opposite sides of the electrode. In some embodiments, the plurality of pairs of tabs can improve the power density of the battery 480 such that the battery 480 can have high performance when discharged at a fast discharging rate.

Figure 5A:
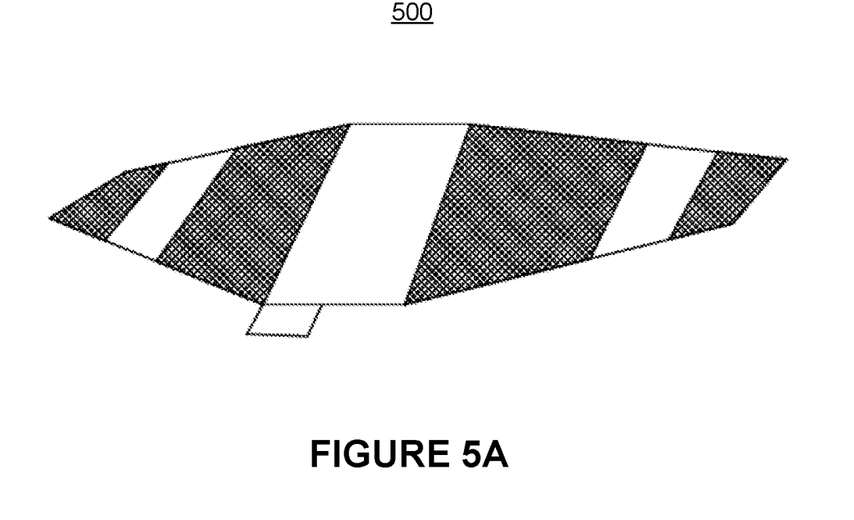
FIGS. 5A-5B are schematic diagrams of customized electrodes for flexible batteries, in accordance with some embodiments.
Figure 5B:
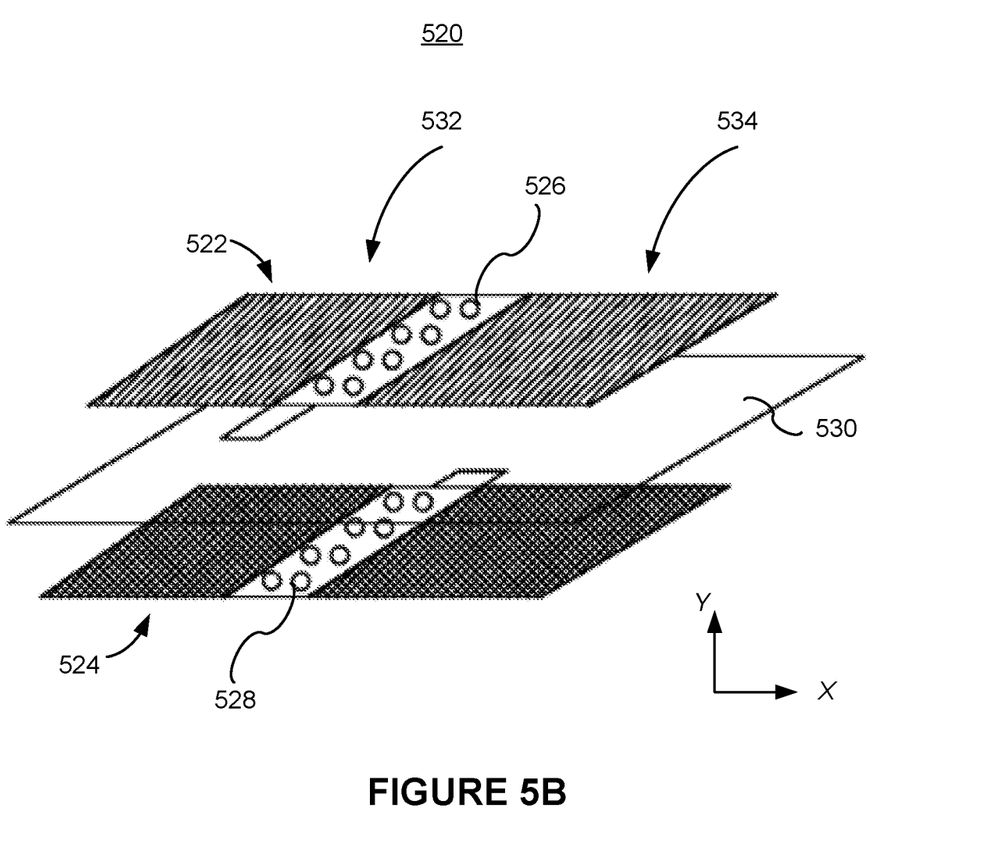

FIGS. 5A-5B are schematic diagrams of customized electrodes for flexible batteries, in accordance with some embodiments. In some embodiments, as illustrated in FIG. 5A, the electrode (e.g., the current collector) 500 has a customized shape that fits in the wearable device. For example, the electrode 500 may be in rectangular shape, square shape, triangular shape, other regular polygons, or asymmetrical polygons. As discussed with reference to FIG. 4A, the electrode 500 may have a plurality of coated segments that are connected via multiple flexible connections respectively to improve the flexibility of the electrode 500.

FIG. 5B is a schematic diagram of a first electrode 522, a separator 530, and a second electrode 524 for making a flexible battery, in accordance with some embodiments. In some embodiments, the first electrode 522, the separator 530, and the second electrode 524 are made of substantially similar materials as the first electrode 100, the separator 118, and the second electrode 110 respectively, as discussed with reference to FIG. 1A. In some embodiments as shown in FIG. 5B, the connection 526 of the first electrode 522 and the connection 528 of the second electrode 524 may each includes a porous structure to further improve the flexibility of the respective electrodes. The tabs may be disposed on the same side or opposite sides of the electrodes.

In some embodiments, the connection may comprise one or more strips (not shown) connecting a first cell 532 with a second cell 534. In some embodiments, the one or more strips are electrical conducting. In some embodiments, the one or more strips are parallel to each other along X direction. In some embodiments, the one or more strips may be portions of the uncoated current collectors (e.g., cathode current collector and/or anode current collector). The number, width, and length of the one or more strips may be selected in accordance with a degree of flexibility (e.g., a range of degrees of bending) required when using the wearable device.

Figure 6A:
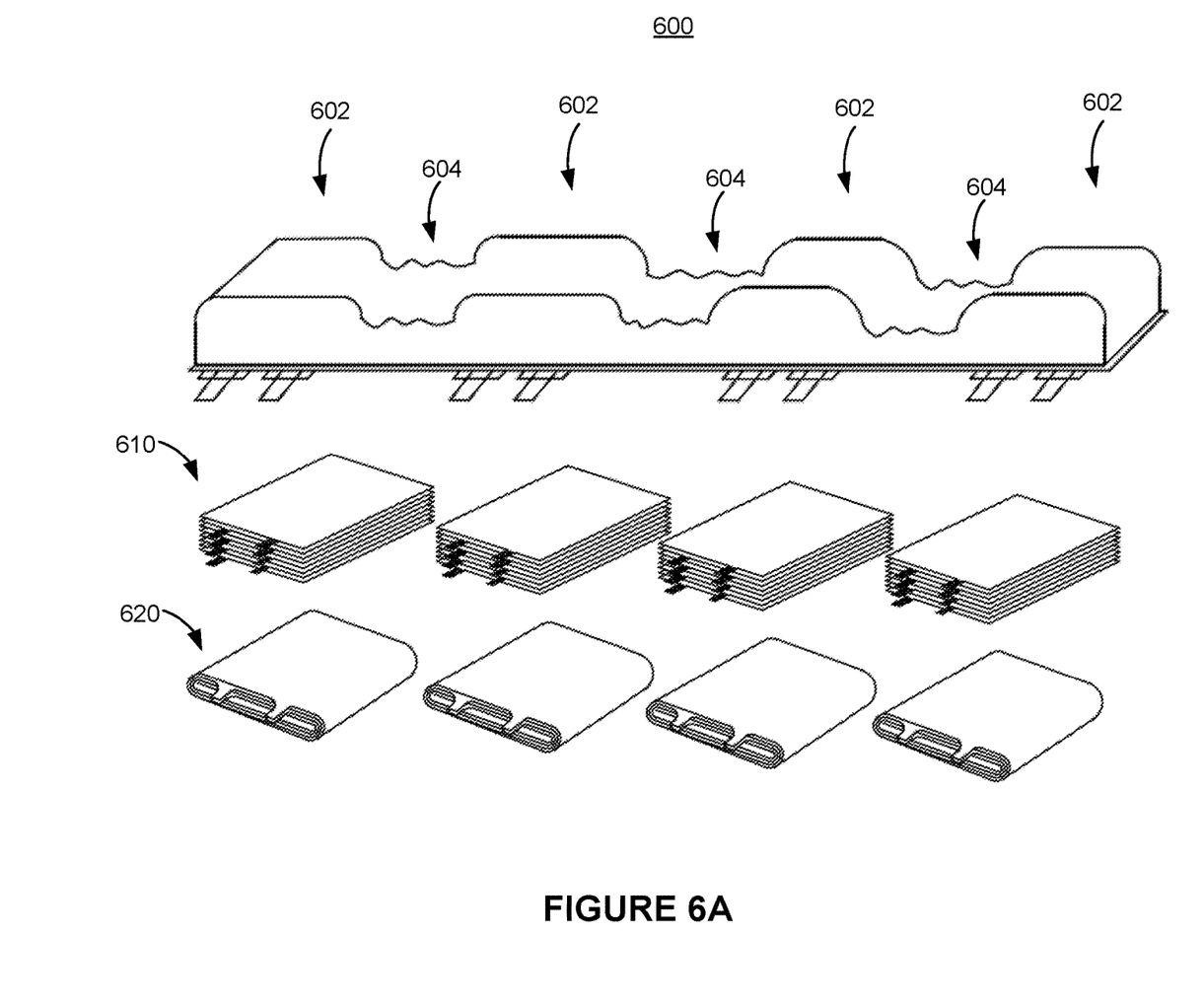
FIG. 6A is a schematic diagram illustrating a flexible battery including a plurality of cells that are interconnected by flexible connections, in accordance with some embodiments.

FIG. 6A is a schematic diagram illustrating a flexible battery 600 including a plurality of cells 602 that are interconnected by flexible connections 604, in accordance with some embodiments. In some embodiment, each cell 602 comprises a stacking cell 610, such as a bi-cell stacking cell or a z-shaped stacking cell. Alternatively, each cell 602 comprises a jelly-roll cell 620. In some embodiments, each electrode within a cell may include a tab. Thus a stacking cell 610 or a rolling cell 620 may include a plurality of pairs of tabs as shown in FIG. 6A. In some embodiments, the flexible battery 600 with a stacking or rolling structure that have a plurality of tabs can provide high energy density and high power density to power the wearable device.

Figure 6B:
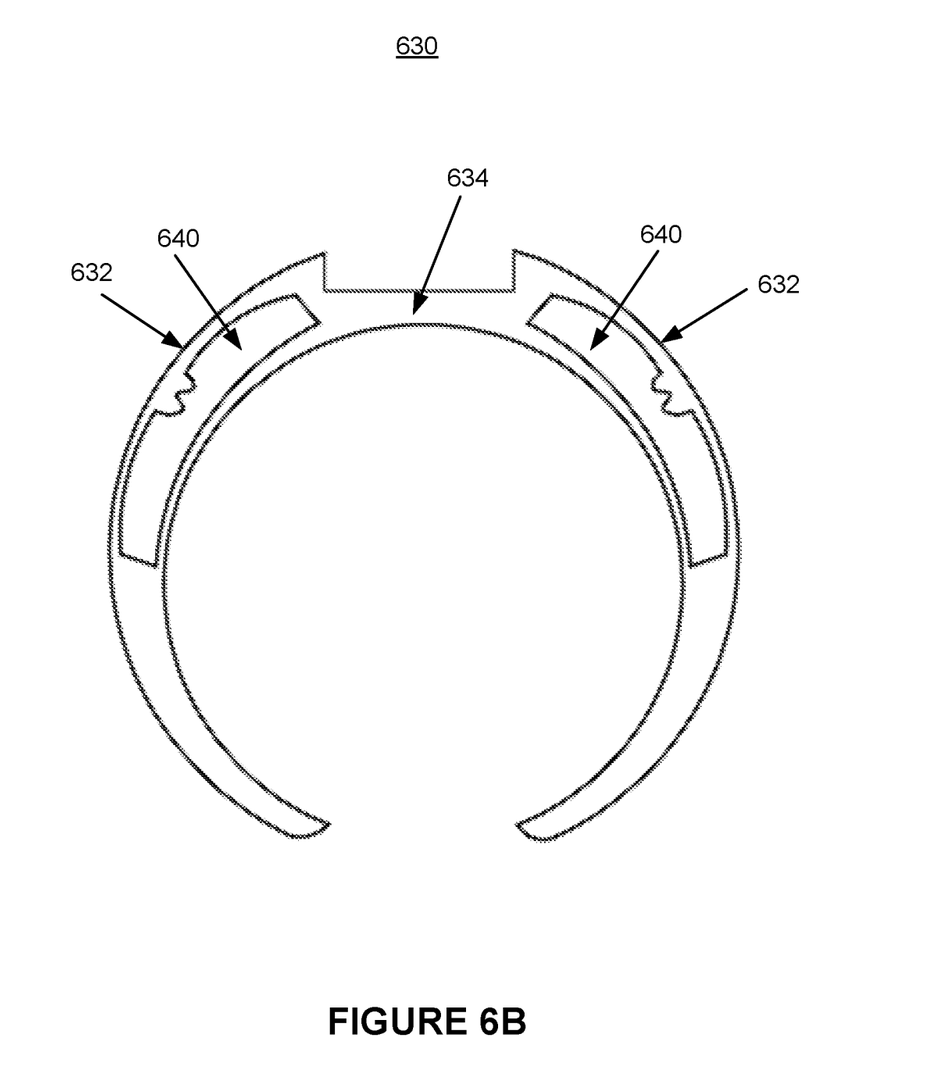
FIG. 6B is a schematic diagram illustrating a wearable device including a plurality of flexible batteries.

FIG. 6B is a schematic diagram illustrating a wearable device 630 including a plurality of flexible batteries 640. In some embodiments, each flexible battery 640 is substantially similar to the flexible battery 140 as discussed with reference to FIG. 1C. In some embodiments, one or more flexible batteries 640 are distributed at one or more curved portions 632 of the wearable device 630.

As illustrated herein, a flexible battery includes a plurality of customized (e.g., curved) cells that are interconnected by one or more flexible connections. In some examples, a flexible connection includes a folded structure that can bend, stretch, or twist without bringing mechanical or electrical failures, or plastic deformation to the materials of the flexible battery. Such flexible battery can be used to power a wearable and bendable device.

The terminology used in the description of the embodiments herein is for the purpose of describing particular embodiments only and is not intended to limit the scope of claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, elements, and/or components, but do not preclude the presence or addition of one or more other features, elements, components, and/or groups thereof.

It will also be understood that, although the terms first, second, etc. may be used herein to describe various elements, these elements should not be limited by these terms. These terms are only used to distinguish one element from another. For example, a first electrode could be termed a second electrode, and, similarly, a second electrode could be termed a first electrode, without departing from the scope of the embodiments. The first electrode and the second electrode are both electrodes, but they are not the same electrode.

The description of the present application has been presented for purposes of illustration and description, and is not intended to be exhaustive or limited to the invention in the form disclosed. Many modifications, variations, and alternative embodiments will be apparent to those of ordinary skill in the art having the benefit of the teachings presented in the foregoing descriptions and the associated drawings. The embodiment was chosen and described in order to best explain the principles of the invention, the practical application, and to enable others skilled in the art to understand the invention for various embodiments and to best utilize the underlying principles and various embodiments with various modifications as are suited to the particular use contemplated. Therefore, it is to be understood that the scope of claims is not to be limited to the specific examples of the embodiments disclosed and that modifications and other embodiments are intended to be included within the scope of the appended claims.

What is claimed is:

1. A battery, comprising:
a first cell;
a second cell interconnected with the first cell; and
a connection electrically coupled between the first cell and the second cell, the connection comprising a folded structure configured to accommodate a dimensional change along a first longitudinal direction between the first cell and the second cell, wherein a length of the connection along the first longitudinal direction is greater than a distance between the first cell and the second cell.

2. The battery of claim 1, wherein the connection comprises a connection current collector.

3. The battery of claim 1, wherein the connection comprises a first connection current collector, a separator, and a second connection current collector that are stacked on each other along a second direction perpendicular to the first direction.

4. The battery of claim 3, wherein:
the first cell comprises:
a first electrode including a first current collector and a first active material coated on a surface of the first current collector; and
a second electrode opposite to the first electrode and including a second current collector and a second active material coated on a surface of the second current collector; and
the second cell comprises:
a third electrode including a third current collector and a third active material coated on a surface of the third current collector; and
a fourth electrode opposite to the third electrode and including a fourth current collector and a fourth active material coated on a surface of the fourth current collector.

5. The battery of claim 4, wherein the first current collector, the first connection current collector, and the third current collector are electrically connected.

6. The battery of claim 1, wherein the connection comprises a porous structure.

7. The battery of claim 1, wherein the connection comprises one or more strips extending from the first cell to the second cell, wherein the one or more strips are parallel to each other along the first direction.

8. The battery of claim 1, the connection comprises a connection packaging film, greater than the distance between the first cell and the second cell.

9. The battery of claim 1, wherein at least one of the first cell and the second cell has an arc structure.

10. The battery of claim 1, wherein the connection comprises a tab.

11. The battery of claim 1, wherein the connection comprises a concave structure that is thinner than the first cell and the second cell.

12. The battery of claim 1, wherein the first cell comprises a stacking cell.

13. The battery of claim 1, wherein the first cell comprises a jelly-roll cell.

14. A battery, comprising:
a cathode including cathode active material coated on a cathode current collector to form a first coated segment, a first uncoated segment, and a second coated segment sequentially disposed along a first direction;
an anode including anode active material coated on an anode current collector to form a third coated segment, a second uncoated segment, and a fourth coated segment sequentially disposed along the first direction, wherein the cathode and the anode are stacked along a second direction perpendicular to the first direction;
wherein:
the first coated segment of the cathode and the third coated segment of the anode form a first cell;
the second coated segment of the cathode and the fourth coated segment of the anode form a second cell; and
the first uncoated segment of the cathode and the second uncoated segment of the anode form a connection electrically coupled between the first cell and the second cell, the connection comprising a folded structure configured to accommodate a dimensional change along a first longitudinal direction between the first cell and the second cell;
wherein a length of the connection along the first longitudinal direction is greater than a distance between the first cell and the second cell.

15. The battery of claim 14, wherein the connection comprises a porous structure.

16. The battery of claim 14, wherein at least one of the first cell and the second cell has an arc structure.

17. The battery of claim 14, wherein the connection further comprises a pair of tabs.

18. A battery, comprising:
a first curved cell;
a second curved cell interconnected with the first curved cell; and
a connection electrically coupled between the first curved cell and the second curved cell, the connection comprising a folded structure configured to accommodate a dimensional change along a first longitudinal direction between the first cell and the second cell;
wherein a length of the connection along the first longitudinal direction is greater than a distance between the first curved cell and the second curved cell; and
wherein the folded structure is bendable.

* * * * *